No. 775,002.

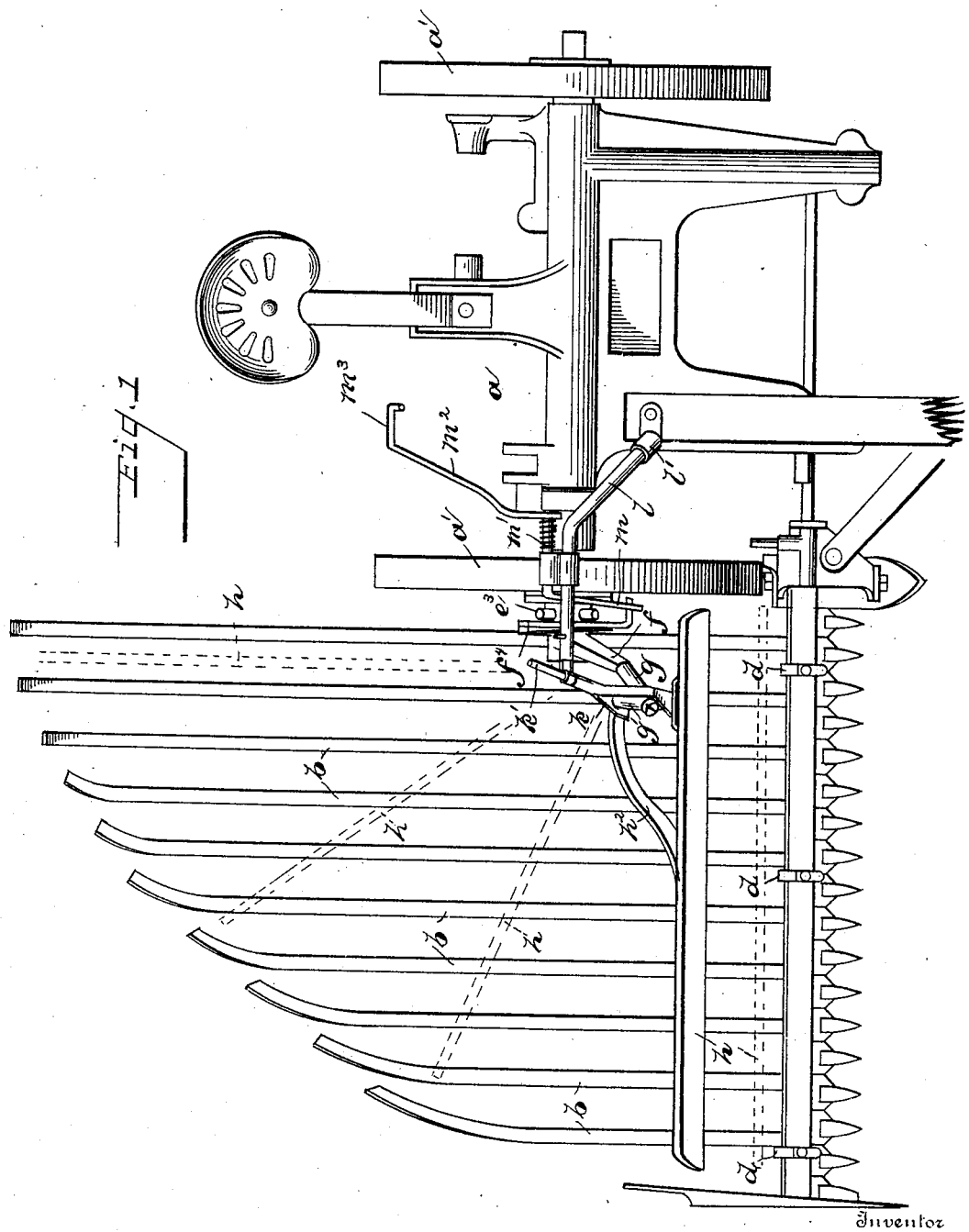

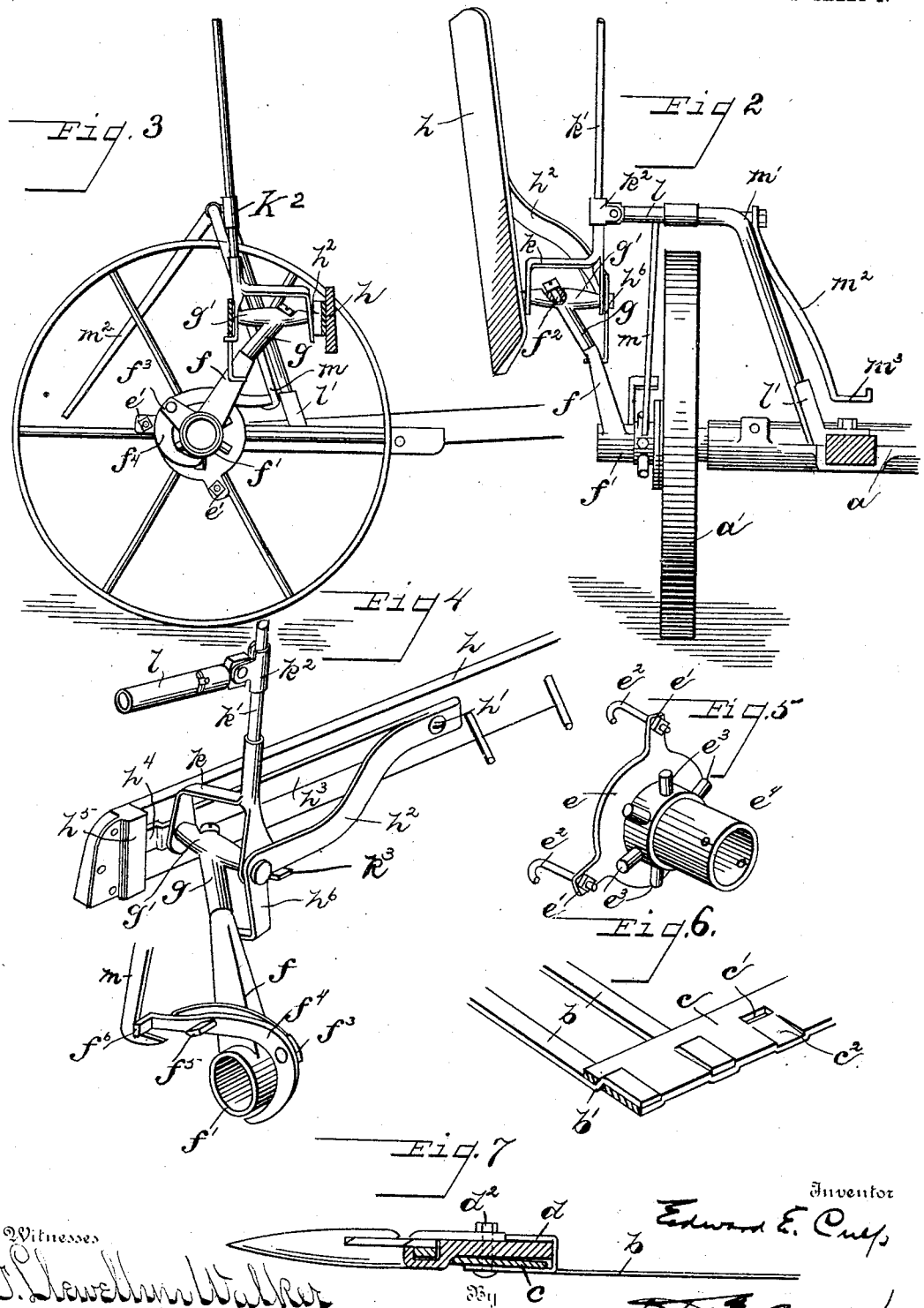

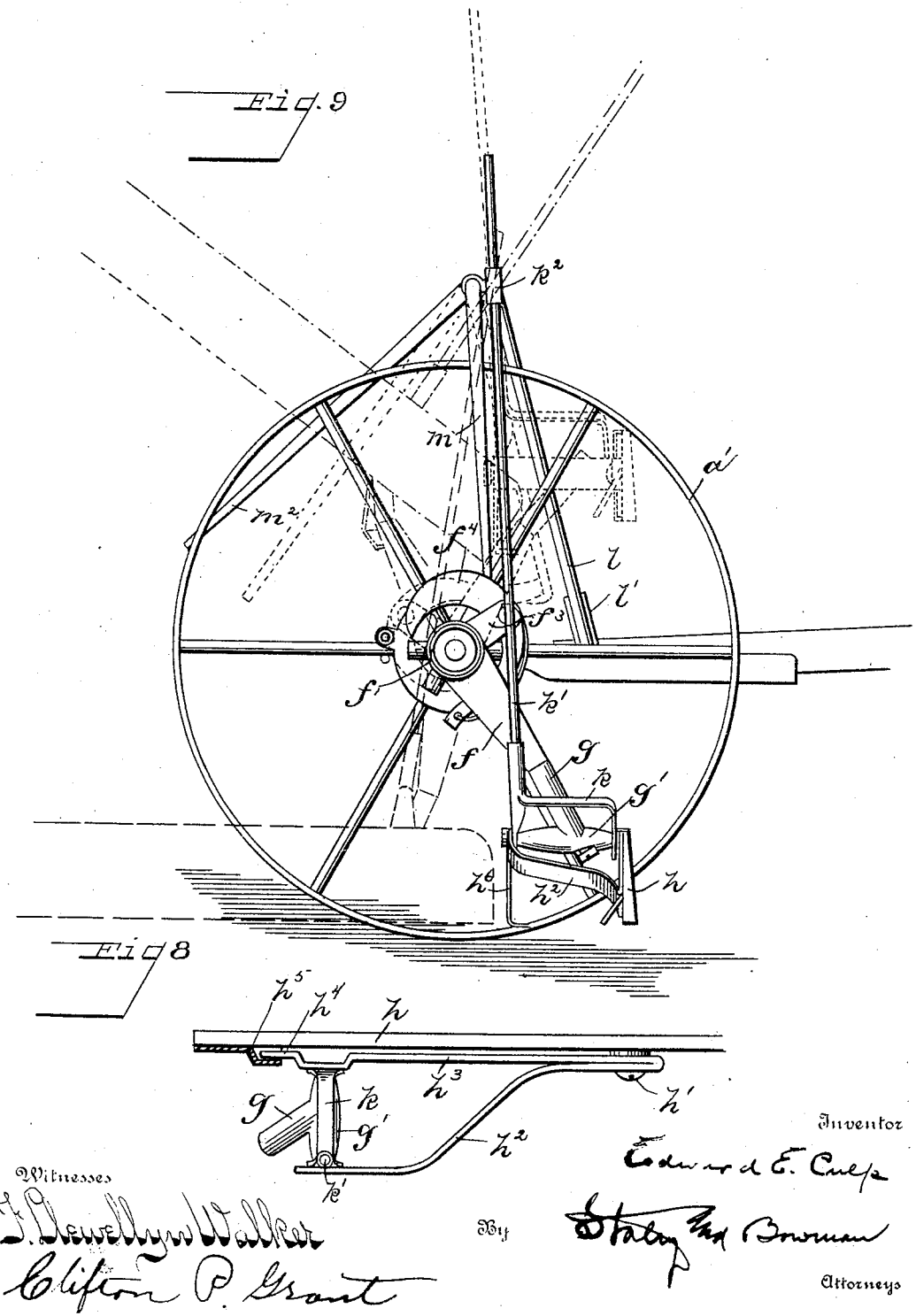

Patented November 15, 1904.

UNITED STATES PATENT OFFICE.

EDWARD E. CULP, OF SPRINGFIELD, OHIO.

CLOVER-BUNCHER.

SPECIFICATION forming part of Letters Patent No. 775,002, dated November 15, 1904.

Application filed September 3, 1903. Serial No. 171,738. (No model.)

*To all whom it may concern:*

Be it known that I, EDWARD E. CULP, a citizen of the United States, residing at Springfield, in the county of Clark and State of Ohio, have invented certain new and useful Improvements in Clover-Bunchers, of which the following is a specification.

My invention relates to improvements in clover-bunchers; and it is designed particularly to be used with mowing-machines in cutting clover and for the purpose of delivering same from the machine in bunches.

I have designed my improved clover-buncher particularly with a view to making it adaptable for use with mowing-machines, and it is preferably made in the form of an attachment which can be readily applied to or removed from the mowing-machine.

In the accompanying drawings, Figure 1 is a plan view of a mower with my improved clover-buncher attached thereto. Fig. 2 is a partial front elevation of the same with the mower partly in section. Fig. 3 is an end elevation of the same with the clover-buncher partly in section. Fig. 4 is a detail view of the rake and the attachment detached. Fig. 5 is a detail view of the supporting-trunnion. Figs. 6 and 7 are detail views showing the construction and manner of attaching the platform. Fig. 8 is a detail of the rake, and Fig. 9 is an end elevation showing the rake in different positions of operation.

In the accompanying drawings, $a$ represents an ordinary mowing-machine, and $a'$ driving-wheels therefor. This machine may be of any desired construction, but is preferably of that construction which is now generally used in the market, having a main shaft with proper driving mechanism for the cutter-bar and driving-wheels at each end of the shaft. This forms no part of my invention, and such parts as are illustrated in the drawings are simply for the purpose of showing the application of my improvements.

In applying my improvements I preferably use a platform consisting of a series of flexible metallic bars $b$, which extend rearwardly from the main cutter-bar and are curved upwardly and inwardly at the rear, the bars being of different lengths to form a curved platform adapted to make a side delivery of the bundle at a point in the rear of the mowing-machine proper, and thus out of the way of the travel of the machine in the next succeeding cut. In forming this clover-receiving platform I provide metallic bars $b$ with dog-leg bends $b'$ near their front ends, and these are slipped through openings $c'$ in a transverse bar $c$. This transverse bar $c$ is also preferably provided with slight depressions or sockets $c^2$, in which the ends of the bars are adapted to rest, and when in their normal positions the bars will thus be held against longitudinal and lateral movement in the transverse bar $c$. It will be understood that in inserting the ends of the bars $b$ into the transverse bar $c$ they must be turned to an unusual position. Hence as long as retained in normal position they will be firmly held in the bars. This transverse bar $c$ is adapted to rest immediately under the main cutter-bar of the mowing-machine, as shown in Fig. 7, and is clamped thereto by U-shaped clamps $d$, which pass around the cutter-bar and the transverse bar $c$ and are held in position by bolts $d^2$ or otherwise, the bolts which hold the ordinary knife-guards of the cutter-bar being preferably employed for this purpose. A simple construction of platform which can readily be removed, if desired, is thus formed, and when removed the transverse bars thereof can be easily detached and folded up in small compass.

The main operating parts of the rake or buncher proper are supported on a hub or sleeve $e$, which is preferably formed with a spider having arms $e'$ and hook-shaped clamping-bolts $e^2$, by means of which it can be readily attached to the driving-wheel of the mower. The sleeve or hub $e$ is adapted to fit over the hub of the driving-wheel, with the clamping-bolts $e^2$ engaging the spokes. Three of these bolts are preferably employed and when attached to the wheel become a part thereof. In the inside, adjacent to the spider of this hub, are pins or projections $e^3$ for the purpose hereinafter specified. The outer end of this hub is preferably reduced to form a journal $e^4$, on which is mounted the hub $f'$ of an arm $f$. This arm $f$ is of rather peculiar construction. It projects at an angle from the hub for about one-half its length and then from this point outwardly at a slightly different angle, the outer end being reduced to form a journal $f^2$, on which is mounted a sleeve $g$. This sleeve $g$ carries at its other end a transverse hub $g'$, having at each end trunnions, by means of which it is attached, in the manner hereinafter more fully described, to the rake $h$. This hub or trunnion $g'$ is so constructed and arranged that when in its normal position, as shown in Fig. 3, the trunnion or hub $g'$ stands in a substantially horizontal position, with the sleeve $g$ extending downwardly and backwardly at an angle thereto, and forms what I will term the "rake-support."

The rake $h$ is pivotally connected at $h'$ to a yoke-frame $h^2$, the respective arms of which are pivotally connected to the ends of the hub $g'$. The inner arm $h^3$ of this yoke-frame $h^2$ is provided with an extension $h^4$, which extends under a keeper $h^5$, firmly connected to the rake, and which permits an adjustment of the rake about the pivot $h'$ within the limits of the keeper $h^5$. The yoke-frame $h^2$ also has a projecting L-shaped arm $h^6$, adapted in the normal rake position to contact with the arm $f$. There is also pivoted to the hub or trunnion $g'$ and within the yoke-frame $h^2$, as clearly shown in Fig. 4, a U-shaped frame $k$, which we will call the "guiding-frame," from one end of the closed side of which there extends a rod $k'$, which passes through a pivoted sleeve $k^2$ on the end of a suitable support $l$, which may be attached to the mowing-machine frame in any suitable manner, so as to eccentrically journal the same—for instance, by means of a foot or casting $l'$, which is bolted to the main frame of the mower, as shown in Fig. 2. Near the extremity of one prong of this U-shaped frame $k$ is a lug or projection $k^3$, adapted to contact with the yoke-frame $h^2$. (See Fig. 4.)

The arm $f$ has pivoted to an extension thereof, as shown at $f^3$, a latch $f^4$, having a finger $f^5$ extending outwardly therefrom and in line with the pins $e^3$ on the main hub. It is also preferably provided with an additional extension $f^6$, which is adapted to be engaged by a hook-shaped end of a swinging arm $m$. This swinging arm $m$ is formed upon or connected to a rock-shaft $m'$, which is journaled in a suitable bearing on the support $l$, and from the opposite end of the rock-shaft $m'$ is a depending lever or arm $m^2$, having a projection or treadle $m^3$ located within easy reach of the foot of the operator. It should be noted that the latch $f^4$ is curved at one end, so as to embrace the hub $f'$ of the main operating-arm $f$.

In normal position the end of the latch $f^4$ is held by the hook-shaped end of the swinging arm $m$, which brings the curved end of the latch against the hub and forms a support for holding the main operating-arm in a position above and extending slightly forward from the main yoke. In this position the rake supported by the yoke which rests on the projection $k^3$ will stand in a horizontal plane at right angles to the plane of the main operating-arm $f$, or, in other words, above and substantially parallel with the cutter-bar. A pressure on the foot-lever $m^3$ will rock the shaft $m'$, swing the hook-arm $m$ away from the latch $f^4$, and thus release the same. This will permit the main operating-arm to swing down by gravity and at the same time cause the finger $f^5$ on the latch to engage one of the pins $e^3$ in the revolving hub and cause the main operating-arm to revolve with the hub. As this arm revolves the rake will be carried downwardly and backwardly until it contacts with the accumulated hay or clover on the platform, pressing the same backwardly.

The pivoted U-shaped frame $k$, being arranged eccentrically to the axis of the main operating-arm and being held by the socket $k^2$ at its outer end, the sleeve $g$ on the arm will as the said arm moves around the hub be turned upon the outer extension of the arm as an axis and will cause the rake to swing around upon the platform in the arc of a circle until it comes to a position substantially at right angles to the cutter-bar or in a plane parallel with the line of draft, the rod $k'$ turning in the socket $k^2$. When this position is reached and as the main operating-arm starts upon its upward movement, the rake will be raised vertically until the extension $h^6$ on the yoke-frame of the rake, engaging with the main operating-arm, will cause the yoke-frame to turn on the pivoted extensions of the arm-sleeve $g'$, thus bringing the rake to an angular position, as shown by the dotted lines in the upper part of Fig. 9, the extension $h^6$ on the yoke-frame $h^2$ supporting the rake in this position. As the arm continues to revolve the U-shaped frame $k$ will turn slightly on the pivoted extremities of the hub $g'$ until the rod $k'$ of said U-shaped frame reaches substantially a vertical position, when by reason of the eccentric relation of the U-shaped frame to this rod and to the operating-arm the sleeve $g$ will again rotate on its axis, and as the operating-arm passes beyond its vertical position further movement of the arm and the force of gravity of the rake will cause it to swing around over the platform until the end $f^6$ of the latch $f^4$ engages the hook-shaped arm $m$, thus releasing the latch from the operating-pins and bringing the rake to rest in its normal position above the frame.

Having thus described my invention, I claim—

1. The combination with the main driving-wheel, of a hub or trunnion having driving projections thereon, an operating-arm sleeved on said trunnion, a rake pivotally connected to said arm, a pivoted latch on said arm, and means for causing said latch to engage with the driving projections, substantially as and for the purpose specified.

2. The combination with the driving-wheel, the operating-arm, means for connecting said arm to said wheel to cause it to rotate therewith, a rake-support journaled on said arm, a rake attached to said rake-support, and a guiding-frame pivoted to said rake-support and journaled at one side of its center to a stationary part, substantially as and for the purpose specified.

3. The combination with the driving-arm and means for rotating the same at intervals as specified, of a rake, a rake-support journaled on said arm, a yoke-shaped frame forming a pivoted movable support between said rake-support and said rake and a guiding-frame pivoted to the rake-support and journaled at one side of its center independent of said rake-support, substantially as specified.

4. The combination with the operating-arm and means for intermittently rotating the same, a yoke pivotally connected to said arm, a rake pivoted to said yoke and means for limiting the movement of said rake about the pivotal connection with said yoke, substantially as and for the purpose set forth.

5. The combination with the driving-wheel, of the main operating-hub adapted to be detachably secured thereto, an operating-arm sleeved on said hub and having engaging means through which said arm may be connected with the hub and turned therewith, a rake pivotally connected with said arm and a turning-frame also connected to said arm and slidingly connected to a stationary part, substantially as and for the purpose specified.

6. The combination with a rake, the operating-arm, and the driving-wheel, of a platform consisting of detachable bars and a transverse bar for supporting said detachable bars when in their normal positions, and means for securing said transverse bar to a harvesting-machine to cause said bars to be held fixedly in their normal positions, substantially as specified.

7. The combination with the flexible bars having offset projections as described, of a transverse bar having perforations adapted to receive said offset projections when turned to an unusual position, depressions in said transverse bar to receive the ends of said offset portions, and means for connecting said transverse bar to a support for holding said flexible bars in their normal positions, substantially as specified.

8. The combination with the driving-wheel and the hub, an operating-arm journaled on said hub, a pivoted latch secured to said arm, projections on said hub to engage said latch, and a hook-shaped arm also adapted to engage said latch to hold it out of engagement with said hub projections, and means for moving said hook-shaped arm to cause the latch to engage said driving projections, substantially as specified.

9. The combination with the main driving-arm having an angular projection on which is journaled a longitudinal sleeve, a transverse trunnion or support arranged at an angle to said sleeve, a U-shaped frame pivoted to said transverse support and having a journal at one side of its center, and a rake pivotally connected to said transverse support, substantially as and for the purpose specified.

In testimony whereof I have hereunto set my hand this 29th day of August, A. D. 1903.

EDWARD E. CULP.

Witnesses:
CHAS. I. WELCH,
CLIFTON P. GRANT.